(12) United States Patent
Yamanaka et al.

(10) Patent No.: US 11,247,573 B2
(45) Date of Patent: Feb. 15, 2022

(54) ELECTRIC VEHICLE

(71) Applicant: TOYOTA JIDOSHA KABUSHIKI KAISHA, Toyota (JP)

(72) Inventors: Kenshi Yamanaka, Nukata-gun (JP); Hiroto Kusaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 16/699,783

(22) Filed: Dec. 2, 2019

(65) Prior Publication Data

US 2020/0207220 A1    Jul. 2, 2020

(30) Foreign Application Priority Data

Dec. 26, 2018 (JP) .............................. JP2018-243414

(51) Int. Cl.
| | |
|---|---|
| *B60L 50/64* | (2019.01) |
| *B60L 50/60* | (2019.01) |
| *H01M 50/50* | (2021.01) |
| *B60K 1/04* | (2019.01) |

(52) U.S. Cl.
CPC ............... *B60L 50/64* (2019.02); *B60L 50/66* (2019.02); *H01M 50/50* (2021.01); *B60K 2001/0422* (2013.01); *B60L 2210/30* (2013.01); *B60L 2210/40* (2013.01); *H01M 2220/20* (2013.01)

(58) Field of Classification Search
CPC .......................... H01M 50/50; B60L 50/64–66
See application file for complete search history.

(56) References Cited

U.S. PATENT DOCUMENTS

| | | | | |
|---|---|---|---|---|
| 7,561,429 | B2* | 7/2009 | Yahata .................. | H02M 7/003 361/715 |
| 7,974,101 | B2* | 7/2011 | Azuma .................... | H01G 9/26 361/760 |
| 8,240,411 | B2* | 8/2012 | Nakatsu .................. | B60L 50/00 180/65.21 |
| 8,693,193 | B2* | 4/2014 | Ishibashi ............... | H02M 7/003 361/688 |
| 8,780,557 | B2* | 7/2014 | Duppong ............... | H05K 7/209 361/699 |
| 8,810,087 | B2* | 8/2014 | Dorr ....................... | B60L 50/51 310/64 |

(Continued)

FOREIGN PATENT DOCUMENTS

| | | |
|---|---|---|
| JP | 2012-085481 A | 4/2012 |
| JP | 2014-239621 A | 12/2014 |

(Continued)

*Primary Examiner* — Jonathan Ng
*Assistant Examiner* — James J Triggs
(74) *Attorney, Agent, or Firm* — Oliff PLC

(57) ABSTRACT

A power unit of an electric vehicle may be connected to a main battery, an AC inlet, and a DC inlet. The power unit may include a battery connector to which a battery power cable is connected, an AC inlet connector to which an AC inlet power cable is connected, and a DC inlet connector to which a DC inlet power cable is connected. The battery connector may be closer to the main battery than a center of the power unit is to the main battery. The AC inlet connector may be closer to the AC inlet than the center of the power unit is to the AC inlet. The DC inlet connector may be closer to the DC inlet than the center of the power unit is to the DC inlet.

4 Claims, 6 Drawing Sheets

(56) References Cited

U.S. PATENT DOCUMENTS

| | | | |
|---|---|---|---|
| 9,030,822 B2* | 5/2015 | Sharaf | H02M 1/44 |
| | | | 361/699 |
| 9,048,708 B2* | 6/2015 | Cloran | H02K 9/22 |
| 9,370,994 B2* | 6/2016 | Yokoyama | B60K 1/00 |
| 2008/0049477 A1* | 2/2008 | Fujino | H02M 7/5387 |
| | | | 363/131 |
| 2015/0210157 A1 | 7/2015 | Yokoyama et al. | |

FOREIGN PATENT DOCUMENTS

| | | |
|---|---|---|
| WO | 2012/049559 A2 | 4/2012 |
| WO | 2014/030445 A1 | 2/2014 |
| WO | 2014/199203 A2 | 12/2014 |

* cited by examiner

ELECTRIC VEHICLE

CROSS-REFERENCE TO RELATED APPLICATION

This application claims priority to Japanese Patent Application No. 2018-243414, filed on Dec. 26, 2018, the entire contents of which are incorporated herein by reference.

TECHNICAL FIELD

The art disclosed herein relates to an electric vehicle.

BACKGROUND

An electric vehicle is provided with an electric power converter configured to convert electric power of a main battery to drive power of a traction motor. An output voltage of the main battery exceeds 100 volts, thus a voltage exceeding 100 volts is applied to the traction motor and the electric power converter. High voltage devices, such as an air conditioner, that are driven by the electric power of the main battery, are installed in the electric vehicle. Alternatively, an inlet configured connectable to an external power supply for charging the main battery is connected to the main battery. The motor, the electric power converter, the inlet and the like are connected to the main battery by power cables.

A power cable in the description herein includes a cable in which electric power from a main battery flows and a cable that transmits electric power to the main battery. A device connected to the main battery by such a power cable is termed a high voltage device in the description herein.

A plurality of high voltage devices is connected to the main battery. An electric vehicle described in International Publication No. WO 2014/030445 A1 is provided with a power distribution module (hereinbelow termed "PDM") for distributing electric power from a main battery to a plurality of high voltage devices. An inverter is mounted on a motor housing that accommodates a traction motor, and the PDM is mounted on the inverter (which is one type of high voltage devices). The PDM distributes DC power of the main battery to the inverter. The inverter converts the DC power of the main battery to drive power of the traction motor. The motor (motor housing) and the inverter are connected by a power cable, and the inverter and the PDM are also connected by another power cable. The PDM and the main battery are also connected by yet another power cable.

On the other hand, Japanese Patent Application Publication No. 2012-85481 and Japanese Patent Application Publication No. 2014-239621 describe electric vehicles that each include an inlet so as to allow a main battery to be charged by receiving electric power from a power supply outside the vehicle. The inlet is connected to the main battery by a power cable and a relay. The external power supply is connected to the inlet. The electric power from the power supply is transmitted to the main battery through the inlet and the power cable. As aforementioned, the inlet is one type of high voltage devices. The electric vehicle of Japanese Patent Application Publication No. 2014-239621 is provided with a DC inlet configured connectable with a direct current power supply (DC power supply) that supplies DC power and an AC inlet configured connectable with an alternating current power supply (AC power supply) that supplies AC power.

SUMMARY

When a number of on-board high voltage devices, such as a main battery, an inverter (motor), and an inlet, becomes large, it is effective to provide a power unit configured to relay electric power from one high voltage device to another high voltage device, however, development of such a power unit has just recently begun, and further improvements can be made. The description herein provides an electric vehicle provided with a power unit that is improved than a conventional power unit.

The electric vehicle of Japanese Patent Application Publication No. 2014-239621 is capable of charging the main battery from either the external AC power supply or DC power supply. In this case, the power unit must be provided with a connector to which a power cable of the AC inlet is connected, a connector to which a power cable of the DC inlet is connected, and a connector to which a power cable of the main battery is connected. The description herein provides an electric vehicle that optimizes an arrangement of connectors of a power unit and an arrangement of a main battery.

An electric vehicle disclosed in the description herein may comprise a main battery, a first inlet, a second inlet, and a power unit. A power supply outside the vehicle may be connectable to the first inlet. Another power supply outside the vehicle may be connectable to the second inlet. The power unit may be connected to the main battery by a battery power cable, connected to the first inlet by a first inlet power cable, and connected to the second inlet by a second inlet power cable. The power unit may comprise a battery connector to which the battery power cable is connected. The power unit further may comprise a first inlet connector to which the first inlet power cable is connected and a second inlet connector to which the second inlet power cable is connected.

The battery connector may be closer to the main battery than a center of the power unit is to the main battery. The first inlet connector may be closer to the first inlet than the center of the power unit is to the first inlet. The second inlet connector may be closer to the second inlet than the center of the power unit is to the second inlet.

According to the above arrangement, distances between the respective devices and their corresponding connectors can be shortened. That is, lengths of the power cables can be shortened. When the lengths of the power cables are shortened, transmission loss of electric power can be suppressed.

Details and further improvements of the art disclosed herein will be described in the following DETAILED DESCRIPTION.

DETAILED DESCRIPTION

First Embodiment

Figure 1:
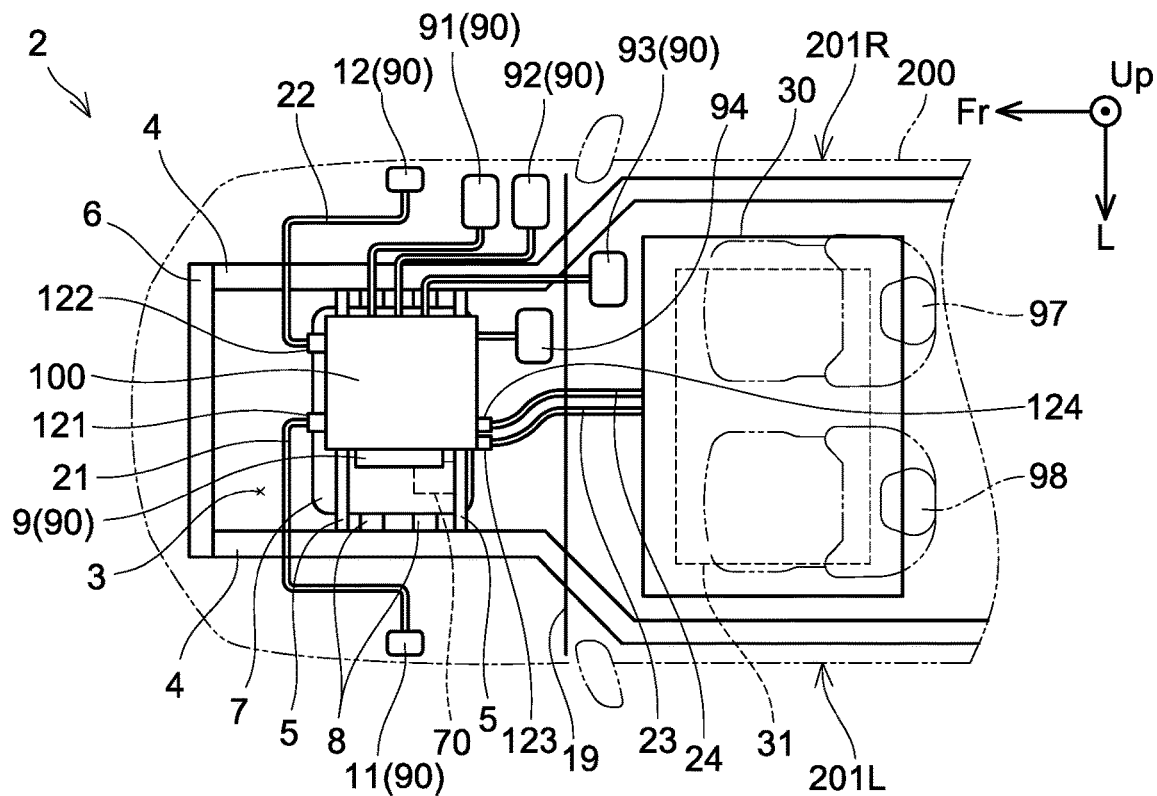
FIG. 1 is a plan view of an electric vehicle of a first embodiment.
Figure 2:
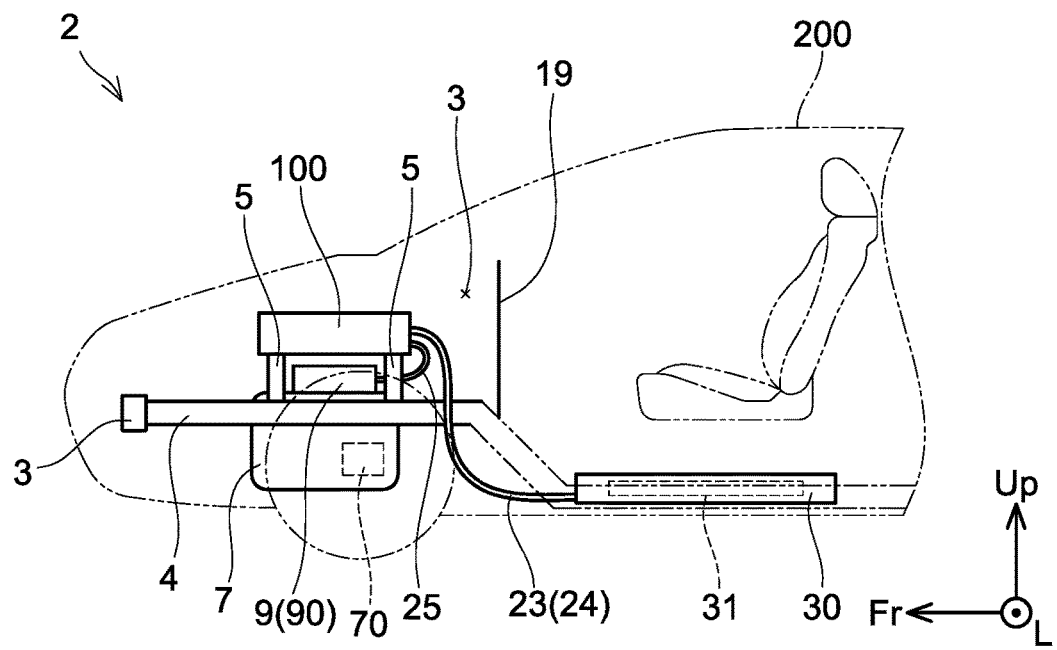
FIG. 2 is a side view of the electric vehicle of the first embodiment.
Figure 3:
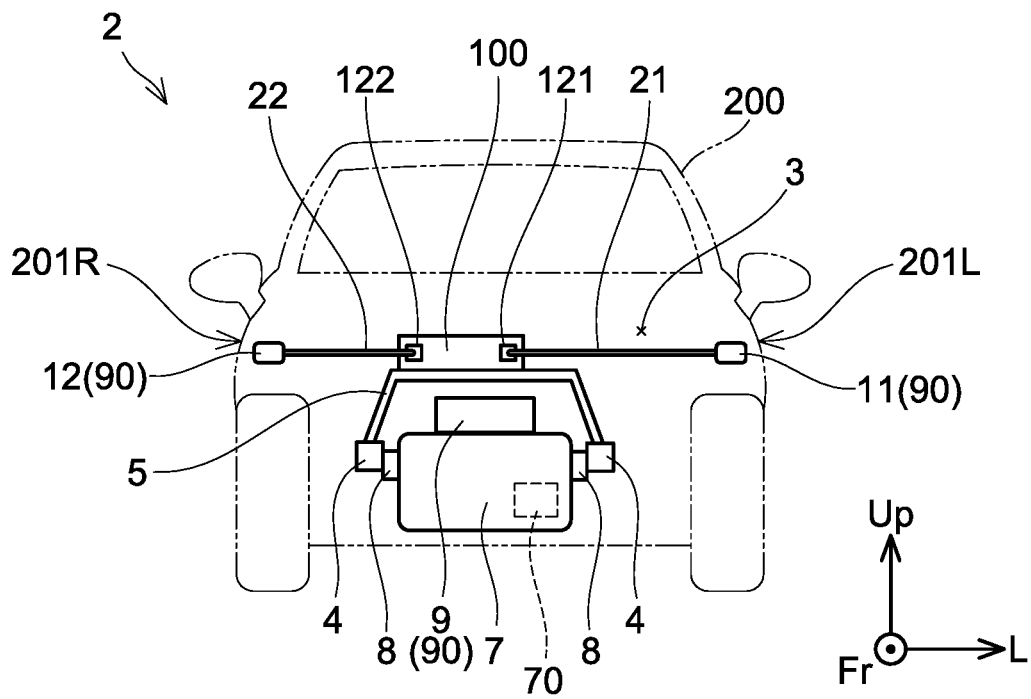
FIG. 3 is a front view of the electric vehicle of the first embodiment.

An electric vehicle 2 of an embodiment will be described with reference to the drawings. FIG. 1 shows a plan view of the electric vehicle 2 of the first embodiment, FIG. 2 shows a side view of the electric vehicle 2, and FIG. 3 shows a front view of the electric vehicle 2. In FIGS. 1 to 3, a body 200, seats 97, 98, and tires are depicted with virtual lines to explain about a device layout in a front compartment 3. Fr in a coordinate system of FIGS. 1 to 3 indicates a vehicle front and Up indicates a vehicle top. L indicates a left lateral side of the vehicle.

The front compartment 3 has a motor housing 7 that accommodates a traction motor 70, an electric power converter 9, a power unit 100, a cooler 91, an air conditioner 92, and an auxiliary battery 94 mounted therein. Further, a DC/AC converter 93 is mounted in a cabin space. A battery pack 30 is arranged under the cabin space. The front compartment 3 and the cabin space are partitioned by a dashboard 19. In FIGS. 2 and 3, depiction of the cooler 91, the air conditioner 92, the auxiliary battery 94, and the DC/AC converter 93 is omitted.

The cooler 91 is configured to cool the motor 70 and the electric power converter 9 (to be described later). The air conditioner 92 is configured to adjust a temperature in the cabin space. The DC/AC converter 93 is provided to enable usage of electric equipment in the cabin space. The cooler 91 and the air conditioner 92 are configured to operate by electric power from a main battery 31.

The main battery 31 having an output voltage of 200 volts is provided in the battery pack 30. In FIG. 3, depiction of the battery pack 30 is also omitted.

Aside from the motor 70, the motor housing 7 further accommodates a gearset and a differential gear connected to an output shaft of the motor 70. Output torque of the motor 70 is transmitted to drive wheels (front wheels) through the gearset and the differential gear. The motor housing 7 is bridged between a pair of side members 4 via vibration absorbers 8. In FIG. 1, a reference sign is not given to the upper vibration absorbers in the drawing. The motor housing 7 receives rotary vibration of the motor 70 and vibration of the gearset, thus vibrates. The vibration absorbers 8 are configured to reduce vibration transmitted from the motor housing 7 to the side members 4.

The pair of side members 4 is a frame extending in a front-rear direction of the vehicle. Distal ends of the pair of side members 4 are connected by a front cross member 6. The pair of side members 4 has their midpoints connected by two cross members 5. In other words, the two cross members 5 are bridged transversely over between the pair of side members 4. The side members 4, the cross members 5, and the front cross member 6 correspond to the frame that ensures strength of the vehicle. In FIG. 2, the side members 4 located rearward than the dashboard 19 are depicted with virtual lines.

The electric power converter 9 is fixed on the motor housing 7. The electric power converter 9 is configured to convert DC power of the main battery 31 to drive power of the motor 70. Since the motor 70 is a three-phase AC motor, the electric power converter 9 includes an inverter. By fixing the electric power converter 9 on the motor housing 7, power cables between the electric power converter 9 and the motor 70 become shorter, and transmission loss of three-phase alternating current can be suppressed. On the other hand, the electric power converter 9 is thereby vibrated with the motor housing 7.

The electric power of the main battery 31 is transmitted to the electric power converter 9 through the power unit 100. The power unit 100 is fixed on the two cross members 5. The power unit 100 is connected to the battery pack 30 (main battery 31) by two battery power cables (first battery power cable 23 and second battery power cable 24). The first battery power cable 23 is connected to a first battery connector 123 provided at a rear portion (rear surface) of the power unit 100. The second battery power cable 24 is connected to a second battery connector 124 provided at the rear portion (rear surface) of the power unit 100. A reason why the power unit 100 and the battery pack 30 (main battery 31) are connected by these two power cables will be described later.

The power unit 100 is connected to the electric power converter 9 by a converter power cable 25 (see FIG. 2). Depiction of the converter power cable 25 is omitted in FIGS. 1 and 3.

The motor housing 7 is supported by the side members 4 via the vibration absorbers 8, and the power unit 100 is fixed on the two cross members 5. In other words, the vibration absorbers 8 are interposed between the power unit 100 and the motor housing 7. The power unit 100 and the motor housing 7 are structurally connected via the vibration absorbers 8. By such a structure, an influence of the vibration of the motor housing 7 which the power unit 100 receives is reduced.

The power unit 100 not only relays the electric power of the main battery 31 to the electric power converter 9, but also relays the electric power of the main battery 31 to the cooler 91 and also to the air conditioner 92. Further, the power unit 100 relays the electric power of the main battery 31 to the auxiliary battery 94 and the DC/AC converter 93 as well. An output voltage of the auxiliary battery 94 is 12 volts, which is lower than the output voltage of the main battery 31 (200 volts). The power unit 100 is provided with a step-down converter (to be described later), and the electric power of the main battery 31 is stepped down and transmitted to the auxiliary battery 94.

The auxiliary battery 94 is charged by the electric power of the main battery 31. The auxiliary battery 94 is configured to supply electric power to low voltage devices which the vehicle is provided with. Low voltage devices mean devices that operate by a voltage of the auxiliary battery 94. Contrary to this, the main battery 31 and the devices to which the electric power is transmitted from the main battery 31 are collectively termed high voltage devices 90. The high voltage devices include the main battery 31, the power unit 100, the electric power converter 9, the cooler 91, the air conditioner 92, and the DC/AC converter 93. A DC inlet 11 and an AC inlet to be described later also transmit power with the main battery 31, thus belong to the high voltage devices 90.

The DC/AC converter 93 steps down the voltage of the main battery 31 and then converts the same to alternating current. Output alternating current of the DC/AC converter 93 conforms to a standard of commercial electric power. That is, the DC/AC converter 93 is used for enabling usage of electric equipment inside the vehicle.

The DC inlet 11 and the AC inlet 12 are also connected to the power unit 100. The DC inlet 11 is arranged at a front portion of a left side surface 201L of the electric vehicle 2 (near a left front fender). In other words, the DC inlet 11 is arranged at a lateral forward portion on a front passenger seat 98 side. The DC inlet 11 is connected to the power unit 100 by a DC inlet power cable 21. The DC inlet power cable 21 is connected to a DC inlet connector 121 provided at a left front portion (left side of a front surface) of the power unit 100. The DC inlet 11 is configured connectable to a connector of a DC power supply that is outside the vehicle. Although details will be given later, the DC inlet power cable 21 is connected to the first battery power cable 23 via the power unit 100. That is, the DC inlet 11 and the main battery 31 are connected via the power unit 100. The main battery 31 is configured capable of being charged by electric power supplied from the external DC power supply through the DC inlet 11. The DC power supply is a device configured to supply DC power.

The AC inlet 12 is arranged at a front portion of a right side surface 201R of the electric vehicle 2 (near a right front fender). In other words, the AC inlet 12 is arranged at a lateral forward portion on a driver seat 97 side. The AC inlet 12 is connected to the power unit 100 by an AC inlet power cable 22. The AC inlet power cable 22 is connected to an AC inlet connector 122 provided at a right front portion (right side of the front surface) of the power unit 100. The AC inlet power cable 22 is connected to the second battery power cable 24 via an AC/DC converter (to be described later) provided in the power unit 100, that is, the AC inlet 12 is connected to the main battery 31 via the AC/DC converter.

The AC inlet 12 is configured connectable with an AC power supply outside the vehicle. The main battery 31 may be charged by electric power supplied from the external AC power supply through the AC inlet 12 and the AC/DC converter. The AC power supply is a device configured to supply AC power. The AC/DC converter is a device configured to convert AC power to DC power.

A charging time of the main battery 31 becomes shorter with larger current of the electric power supplied from the external power supply. In order to flow large current, allowable current each of the DC inlet power cable 21 and of the first battery power cable 23 is 250 amperes or more. Cross-sectional areas of the DC inlet power cable 21 and of the first battery power cable 23 are each 100 (mm$^2$) or more to withstand current of 250 amperes or more. When the cross-sectional area is 100 (mm$^2$) or more, flexibility of the power cable becomes quite low. The power cables with such low flexibility with the cross-sectional areas of 100 (mm$^2$) or more are connected to the power unit 100. When the power unit 100 to which the power cables with the low flexibility are connected is connected to the motor housing 7, the power cables vibrate accompanying the vibration of the motor housing 7. There may be a fear that, when the power cables with the low flexibility vibrate, high stress is generated at connectors (connectors of the power unit 100) connecting the power cables. Alternatively, a space must be secured around the power cables with the low flexibility to tolerate the vibration thereof. As aforementioned, in the electric vehicle 2 of the embodiment, the influence of the vibration of the motor housing 7 is reduced by fixing the power unit 100 to the cross members 5.

In the converter power cable 25 connecting the power unit 100 and the electric power converter 9, only the current that is less than 250 amperes flows therein. Due to this, a cross-sectional area of the converter power cable 25 is smaller than each of the cross-sectional areas of the DC inlet power cable 21 and the first battery power cable 23. That is, the converter power cable 25 has higher flexibility than the DC inlet power cable 21. The electric power converter 9 is fixed on the motor housing 7, and vibrates together with the motor housing 7. Even if the electric power converter 9 vibrates, an influence of the vibration of the motor housing 7 imposed on the power unit 100 via the converter power cable 25 is minor as compared to a case where a power cable with a large diameter is connected.

Second Embodiment

Figure 4:
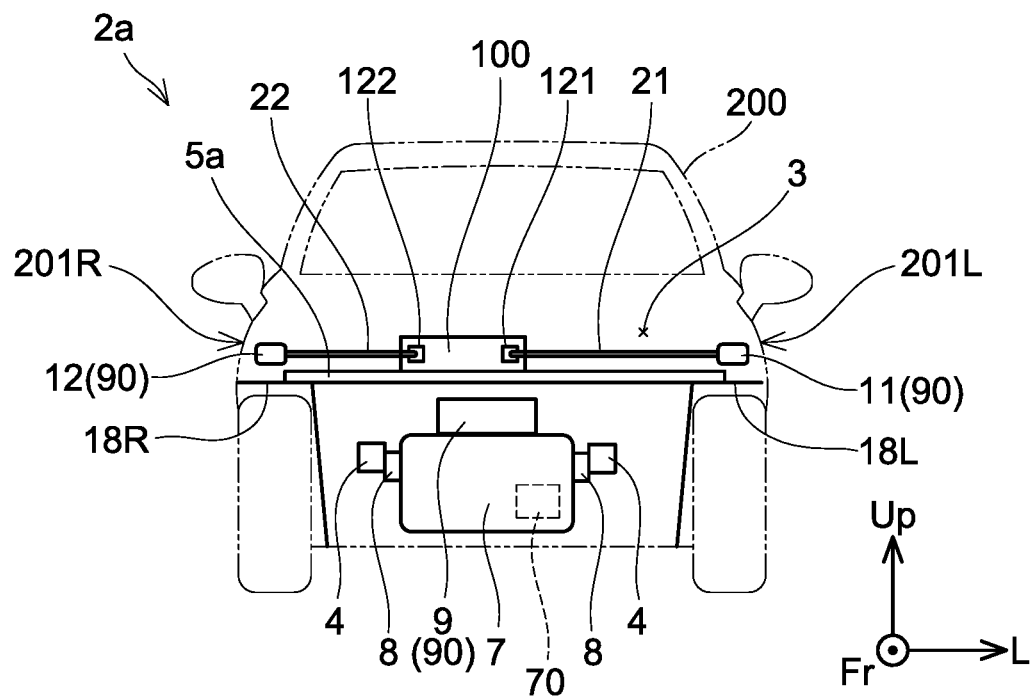
FIG. 4 is a front view of an electric vehicle of a second embodiment.

FIG. 4 shows a front view of an electric vehicle 2a of a second embodiment. In the electric vehicle 2a of the second embodiment, a plate 5a is bridged transversely over a left suspension tower 18L and a right suspension tower 18R, and the power unit 100 is fixed on the plate 5a. Other structures are same as those of the electric vehicle 2 of the first embodiment. That is, the power unit 100 is fixed to the body 200 via the plate 5a.

The left suspension tower 18L and the right suspension tower 18R are parts of the body 200 of the electric vehicle 2a. Even by fixing the power unit 100 to the body of the electric vehicle, the influence of the vibration which the power unit 100 receives from the motor housing 7 can be suppressed.

The above configuration can also be expressed as follows. That is, the vibration absorbers 8 are interposed between the power unit 100 and the motor housing 7. Due to this, the influence of the vibration which the power unit 100 receives from the motor housing 7 is reduced. The power unit 100 may be fixed on a cross member bridged transversely over the left suspension tower 18L and the right suspension tower 18R instead of being fixed on the plate 5a.

Third Embodiment

Figure 5:
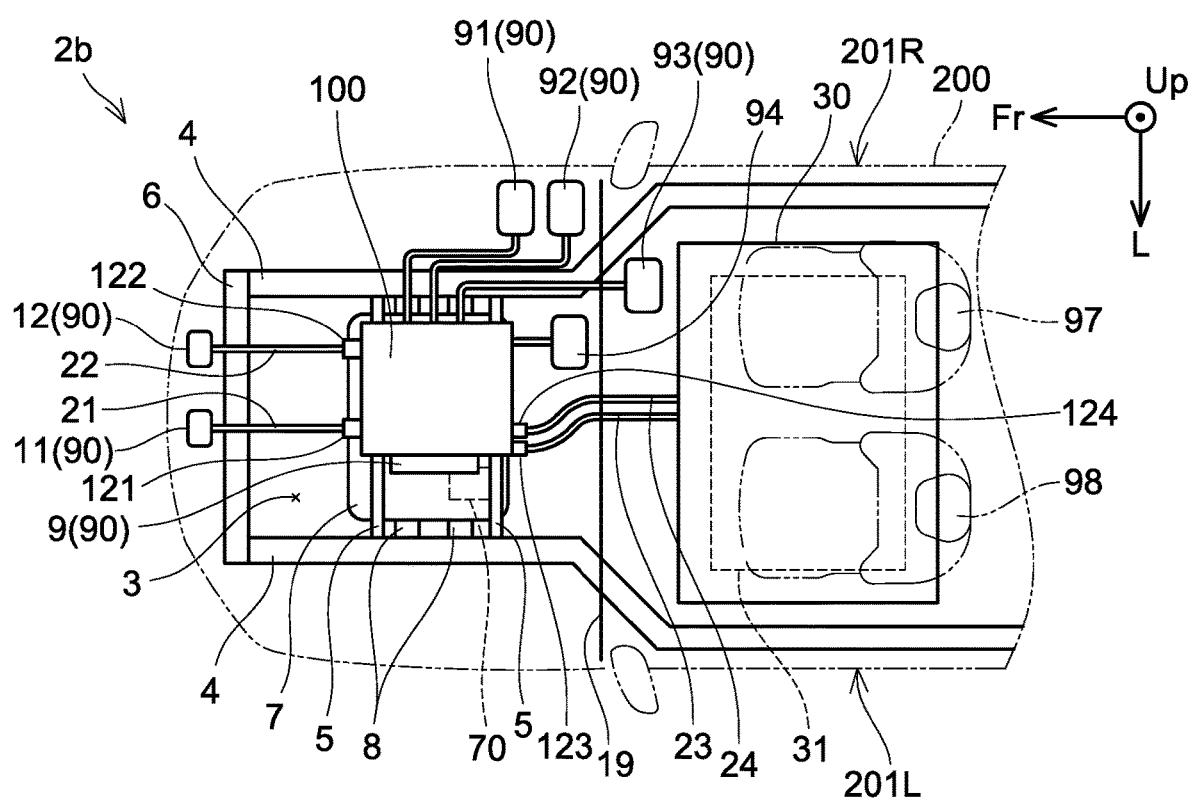
FIG. 5 is a plan view of an electric vehicle of a third embodiment.

FIG. 5 shows a plan view of an electric vehicle 2b of a third embodiment. In the electric vehicle 2b of the third embodiment, the DC inlet 11 and the AC inlet 12 are provided at a front portion of the body 200. Other structures are same as those of the electric vehicle 2 of the first embodiment. In the electric vehicle 2b of the third embodiment, the battery pack 30 (main battery 31) is arranged rearward than the power unit 100, and the first battery power cable 23 (and the second battery power cable 24) extending from the main battery 31 is connected to the first battery connector 123 (and the second battery connector 124) provided at the rear portion (rear surface) of the power unit 100. On the other hand, the DC inlet 11 is provided forward than the power unit 100, and the DC inlet power cable 21 extending from the DC inlet 11 is connected to the DC inlet connector 121 provided on the front portion (front surface) of the power unit 100. The AC inlet 12 is also provided forward than the power unit 100, and the AC inlet power cable 22 extending from the AC inlet 12 is connected to the AC inlet connector 122 provided on the front portion (front surface) of the power unit 100.

Figure 6:
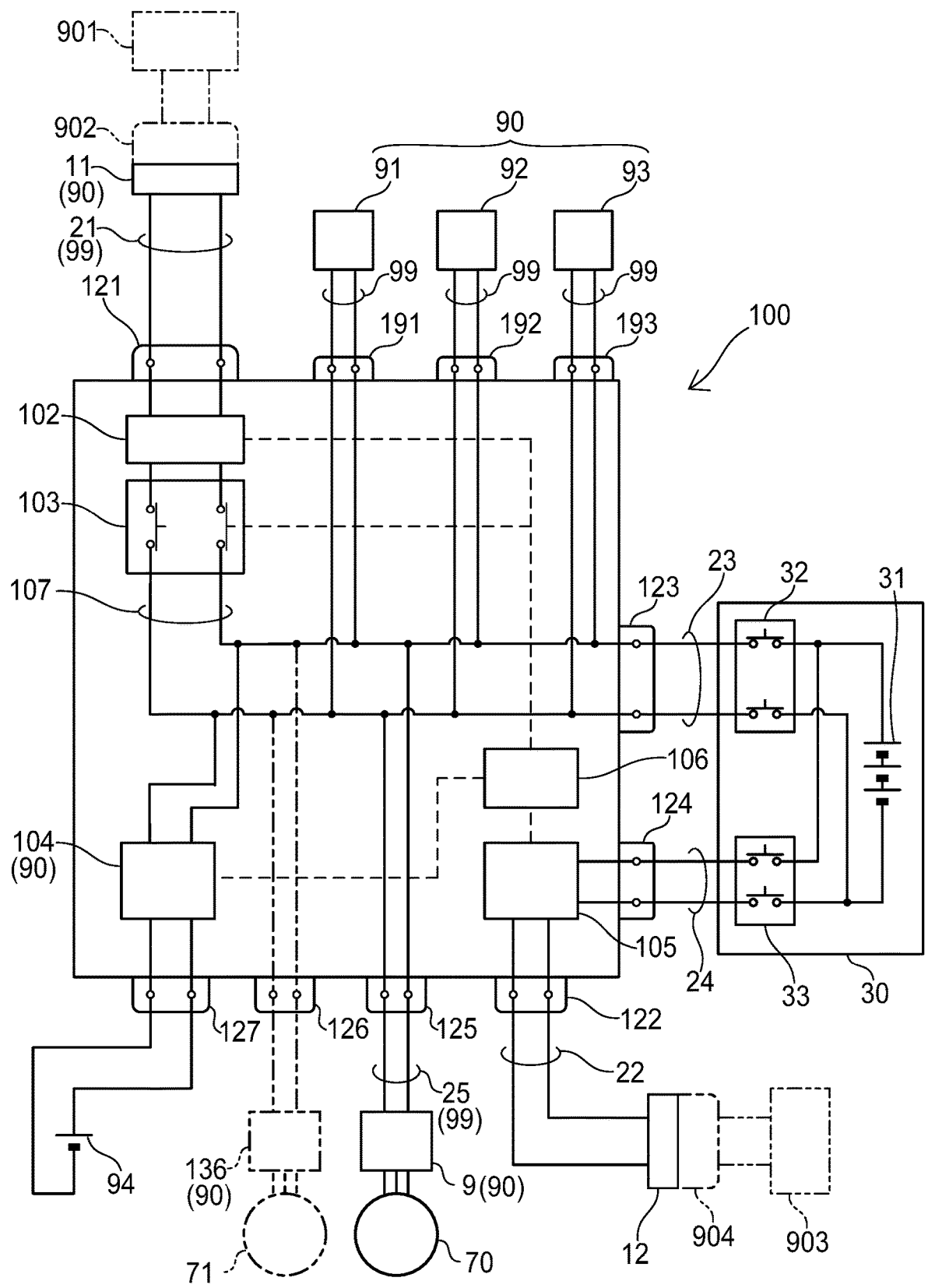
FIG. 6 is a block diagram showing an internal structure of a power unit.

Arrangement of connectors including connectors for other high voltage devices 90 will be described later again. (Power Unit) Next, a circuitry configuration of the power unit 100 that applies similarly to the first to third embodiments will be described. FIG. 6 shows a block diagram of an inside of the power unit. The power unit 100 has the main battery 31 (battery pack 30), the DC inlet 11, the AC inlet 12, the electric power converter 9, the cooler 91, the air conditioner 92, the DC/AC converter 93, and the auxiliary battery 94 connected thereto.

The power unit 100 and the main battery 31 are connected by two power cables (the first battery power cable 23 and the second battery power cable 24). The first battery power cable 23 is connected to the first battery connector 123 of the power unit 100. The second battery power cable 24 is connected to the second battery connector 124 of the power unit 100.

Inside the battery pack 30, the first battery power cable 23 is connected to the main battery 31 via a system main relay 32, and the second battery power cable 24 is connected to the main battery 31 via an AC charging relay 33. The system main relay 32 and the AC charging relay 33 are controlled by a host controller that is not shown.

Inside the power unit 100, terminals of the first battery connector 123 are connected to main power line 107. Various connectors are connected to the main power line 107. A cooler connector 191, an air conditioner connector 192, a DC/AC converter connector 193, and a converter connector 125 are connected to the main power line 107. The main power line 107 and the cooler 91 are connected via the cooler connector 191, the main power line 107 and the air conditioner 92 are connected via the air conditioner connector 192, and the DC/AC converter 93 and the main power line 107 are connected via the DC/AC converter connector 193. Further, the electric power converter 9 is connected to the main power line 107 via the converter connector 125. Power cables that connect the high voltage devices 90 and their corresponding connectors, such as power cable connecting the cooler 91 to the cooler connector 191 and a power cable connecting the air conditioner 92 to the air conditioner connector 192, are collectively termed device power cables 99 in FIG. 6. For convenience of explanation, the AC inlet power cable 22 that connects the AC inlet 12 and the AC inlet connector 122 is excluded from the device power cables 99.

The main power line 107 has an auxiliary battery connector 127 connected thereto via a step-down converter 104. A power cable extending from the auxiliary battery 94 is connected to the auxiliary battery connector 127. The step-down converter 104 is configured to step down the voltage of the main battery 31 to the voltage of the auxiliary battery 94. That is, the auxiliary battery 94 is charged by the electric power of the main battery 31.

The main power line 107 is connected to the main battery 31 via the first battery connector 123, the first battery power cable 23, and the system main relay 32. Primary high voltage devices 90 mounted in the vehicle (including the electric power converter 9 and the step-down converter 104) are connected to the main battery 31 via the main power line 107, the first battery connector 123, the first battery power cable 23, and the system main relay 32. In a case where the electric vehicle 2 is provided with a rear motor 71 configured to drive rear wheels, a rear electric power converter 136 configured to drive the rear motor 71 is connected to the main power line 107 via a rear converter connector 126. The rear electric power converter 136 also belongs to the high voltage devices 90.

The main power line 107 is a primary power line for relaying the electric power of the main battery 31 to the vehicle-mounted high voltage devices 90.

Aside from the step-down converter 104, the power unit 100 is provided with a DC relay 103, a leak current detector 102, an AC/DC converter 105, and a controller 106. The step-down converter 104, the DC relay 103, the leak current detector 102, and the AC/DC converter 105 are controlled by the controller 106. In FIG. 6, broken lines in the power unit 100 indicate signal lines. Solid lines in the power unit 100 indicate power lines.

The DC inlet connector 121 is connected to the main power line 107 via the DC relay 103 and the leak current detector 102. As aforementioned, one end of the DC inlet power cable 21 is connected to the DC inlet connector 121. The DC inlet 11 is connected to the other end of the DC inlet power cable 21. A connector 902 of a DC power supply 901 outside the vehicle can be connected to the DC inlet 11.

When the connector 902 of the DC power supply 901 is connected to the DC inlet 11, the controller 106 of the power unit 100 closes the DC relay 103, by which the external DC power supply 901 and the main battery 31 are connected. The system main relay 32 is closed by the host controller that is not shown. The main battery 31 is charged by electric power supplied from the DC power supply 901. The DC power supply 901 is a facility configured capable of supplying DC power.

The electric vehicle 2 (2a, 2b) is capable of charging the main battery 31 by the large current exceeding 250 amperes. That is, the electric vehicle 2 (2a, 2b) can charge the main battery 31 at fast speed by receiving supply of the large current exceeding 250 amperes from the external DC power supply 901. Due to this, the DC inlet 11, the DC inlet power cable 21, the DC inlet connector 121, the main power line 107, the first battery connector 123, the first battery power cable 23, and the system main relay 32 are designed to withstand the large current exceeding 250 amperes. Especially, cables each having the cross-sectional area of 100 ($mm^2$) or more are used as the DC inlet power cable 21 and the first battery power cable 23.

The power cables other than the DC inlet power cable 21 and the first battery power cable 23 each have the cross-sectional area that is less than 100 ($mm^2$). The power cables other than the DC inlet power cable 21 and the first battery power cable 23 may typically be 60 ($mm^2$) or less.

On the other hand, the electric vehicle 2 (2a, 2b) is also capable of charging the main battery 31 by AC power of an external AC power supply 903. The AC power supply 903 is a facility configured capable of supplying AC power.

A connector 904 of the AC power supply 903 is connected to the AC inlet 12. The AC inlet power cable 22 extending from the AC inlet 12 is connected to the AC inlet connector 122 of the power unit 100. The AC inlet connector 122 is connected to an AC input terminal of the AC/DC converter 105 and a DC output terminal of the AC/DC converter 105 is connected to the second battery connector 124. The AC/DC converter 105 is configured to convert the AC power supplied from the external AC power supply 903 to DC power, and further steps it up to the voltage of the main battery 31. Output current of the AC/DC converter 105 is 100 amperes or less. Due to this, the cross-sectional area of the second battery power cable 24 is less than 100 ($mm^2$). In other words, the cross-sectional area of the first battery power cable 23 is larger than the cross-sectional area of the second battery power cable 24. Further, the cross-sectional area of the DC inlet power cable 21 is larger than the cross-sectional area of the second battery power cable 24.

As shown in FIG. 6, the power unit 100 is connected to the main battery 31 by the first battery power cable 23 and is connected to the main battery 31 by the second battery power cable 24 as well. The power unit 100 and the main battery 31 have two power cables connected therebetween in parallel. Further, the AC/DC converter 105 is connected to the second battery power cable 24 inside the power unit 100. The connectors for connecting to the other high voltage devices 90 are connected to the first battery power cable 23. Examples of the other high voltage devices 90 connected to the first battery power cable 23 are the electric power converter 9, the cooler 91, the air conditioner 92, the DC/AC converter 93, the DC relay 103, and the like. Advantages of the aforementioned structure will be described.

Firstly, even when a short circuit occurs in an AC charging system (which is a collective term for the AC inlet 12, the AC inlet power cable 22, the AC inlet connector 122, the AC/DC converter 105, and the second battery power cable 24), the electric vehicle 2 (2a, 2b) can still travel. When the short circuit occurs in the AC charging system, the host controller that is not shown opens the AC charging relay 33 and cuts off the AC charging system from the main battery 31. The electric power can still be supplied from the main battery 31 to the high voltage devices 90 through the first battery power cable 23 even when the short circuit occurs in the AC charging system.

Secondly, by opening the system main relay 32 while charging the main battery 31 by receiving the electric power from the AC power supply 903 through the AC inlet 12, other high voltage devices 90 can be cut off from the main battery 31. The plurality of high voltage devices 90 includes devices which are not provided with a main switch and are configured to start up when the electric power is supplied thereto. If the main battery 31 is charged with the electric power from the AC power supply 903 while the system main relay 32 is closed, such high voltage devices 90 not provided with the main switch may start up although their startup is not necessary. Such unnecessary startup of the high voltage devices 90 brings forth wasteful electric power consumption and deteriorates the high voltage devices 90 at a faster rate. By opening the system main relay 32 during the charge by the AC power supply 903, an influence of the electric power obtained from the AC power supply 903 can be suppressed from being imposed on the other high voltage devices 90.

Thirdly, by connecting the power unit 100 and the battery pack 30 accommodating the main battery 31 by two power cables, safety and spatial efficiency can both be achieved with excellent balance therebetween. Firstly, during when a main switch of the vehicle is off, the high-voltage main battery 31 is preferably cut off from the other high voltage devices, and in order to do so, it is preferable to provide a relay (system main relay 32) in the battery pack 30.

Further, when the battery pack 30 and the power unit 100 are connected by one power cable, the power line needs to be branched inside the power unit 100 into a high voltage device system and the AC charging system, and separate relays need to be provided for the respective systems. In this case, one relay is provided in the battery pack 30 and two relays are provided in the power unit 100. As such, three relays become necessary when the battery pack 30 and the power unit 100 are connected by one power cable. Especially large current may flow in the cable that electrically connects with the external DC power supply 901, thus a relay size accordingly becomes larger. That is, a large-sized relay becomes necessary for each of the battery pack 30 and the power unit 100. As aforementioned, current exceeding 250 amperes does not flow in the AC charging system. Due to this, the power cable dedicated to AC charging (second battery power cable 24) may have a smaller diameter than the power cable (first battery power cable 23) used in DC charging, and a size of the relay used for the AC charging may be smaller than a size of the relay used for the DC charging. The electric vehicle 2 of the embodiment connects the battery pack 30 and the power unit 100 by two power cables, however, a size of the power unit 100 can be made compact since it simply needs to be provided with the system main relay 32 having a large size for the DC charging and the AC charging relay 33 having a small size for the AC charging. By accommodating the AC charging relay 33 in the battery pack 30 as well, all the high voltage devices 90 can be cut off from the battery pack 30 while the main switch of the vehicle is off. That is, by connecting the battery pack 30 and the power unit 100 by two power cables, both the safety and the spatial efficiency can be achieved.

Figure 7:
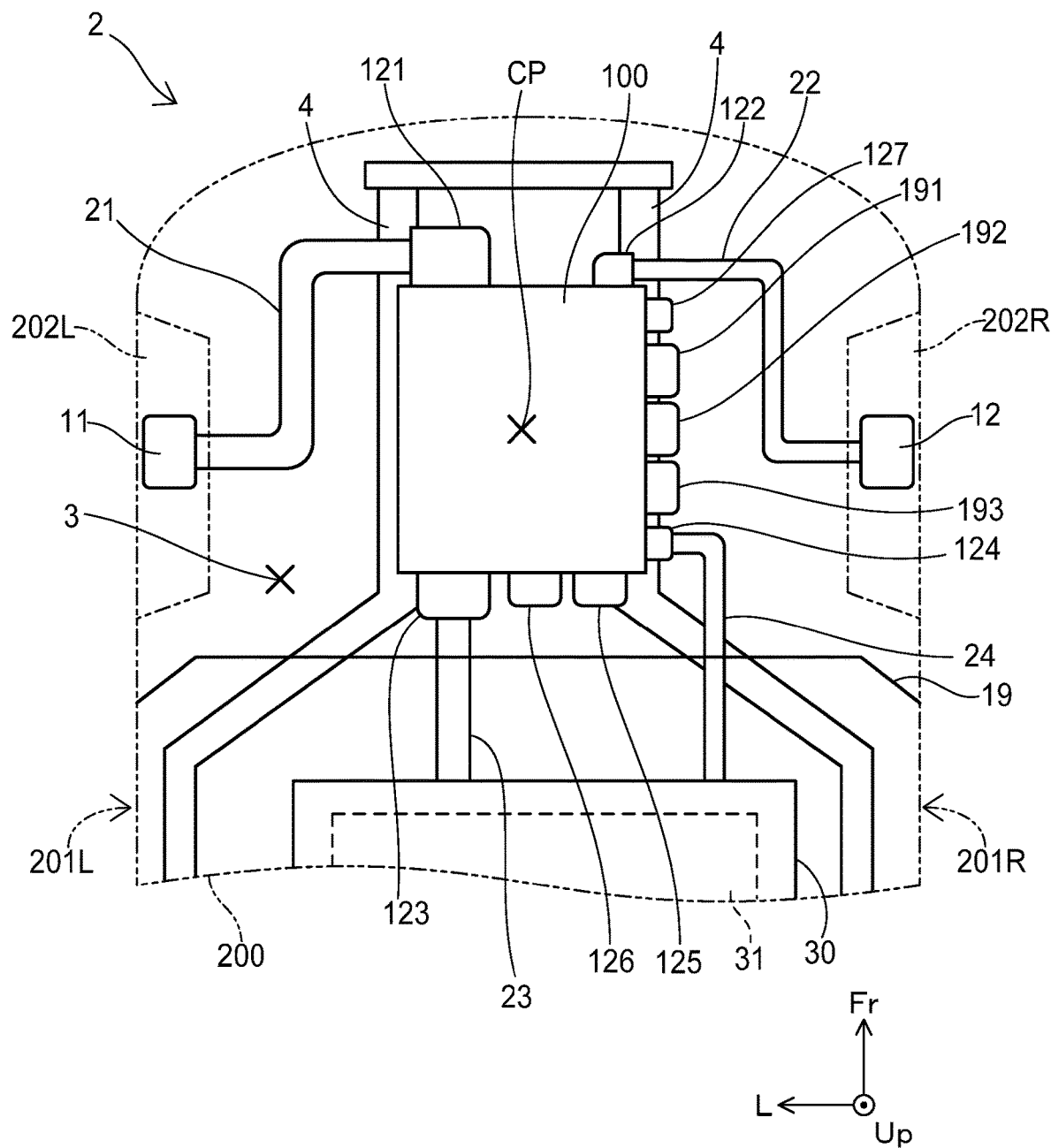
FIG. 7 is a plan view showing an arrangement of connectors of the power unit.

The arrangements of the connectors which the power unit 100 has will be described in detail. FIG. 7 shows a plan view of the front compartment 3. FIG. 7 shows a relationship of the power unit 100 and the connectors thereof, the battery pack 30 (main battery 31), the DC inlet 11, and the AC inlet 12, and some of components that were depicted in the plan view of FIG. 1 are omitted. Further, the body 200 is depicted in a virtual line in FIG. 7 as well. In FIG. 7, the power unit 100 is fixed to two side members 4.

The DC inlet 11 is arranged on the left side surface 201L of the body 200, and the AC inlet 12 is arranged on the right side surface 201R. More specifically, the DC inlet 11 is arranged near the left front fender 202L and the AC inlet 12 is arranged near the right front fender 202R. The DC inlet connector 121 is arranged on the left front side of the power unit 100 and the AC inlet connector 122 is arranged on the right front side of the power unit 100. The DC inlet 11 and the DC inlet connector 121 are connected by the large-diameter DC inlet power cable 21 having the cross-sectional area of 100 (mm$^2$) or more. The AC inlet 12 and the AC inlet connector 122 are connected by the AC inlet power cable 22 having the cross-sectional area smaller than that of the DC inlet power cable 21.

The DC inlet 11 and the DC inlet connector 121 are arranged leftward from a center CP of the power unit 100 and the AC inlet 12 and the AC inlet connector 122 are arranged rightward from the center CP of the power unit 100.

The AC inlet connector 122 is arranged closer to the AC inlet 12 than the center CP of the power unit 100 is to the AC inlet 12. The DC inlet connector 121 is arranged closer to the DC inlet 11 than the center CP of the power unit 100 is to the DC inlet 11.

The main battery 31 is arranged at a vehicle rear side from the power unit 100. The first battery connector 123 is arranged on the rear surface of the power unit 100 and the second battery connector 124 is arranged at the rear portion (right rear portion) of the power unit 100. In other words, the battery connectors 123, 124 are arranged closer to the main battery 31 than the center CP of the power unit 100 is to the main battery 31.

According to the above arrangement, the power cables (DC inlet power cable 21 and AC inlet power cable 22) between the inlets and the power unit can be made short, and the battery power cables 23, 24 can also be made short.

The converter connector 125 and the rear converter connector 126 are provided on the rear surface of the power unit 100. The auxiliary battery connector 127 is provided on a front side of a right side surface of the power unit 100. The cooler connector 191, the air conditioner connector 192, and the DC/AC converter connector 193 are provided on the right side surface of the power unit 100.

Figure 8:
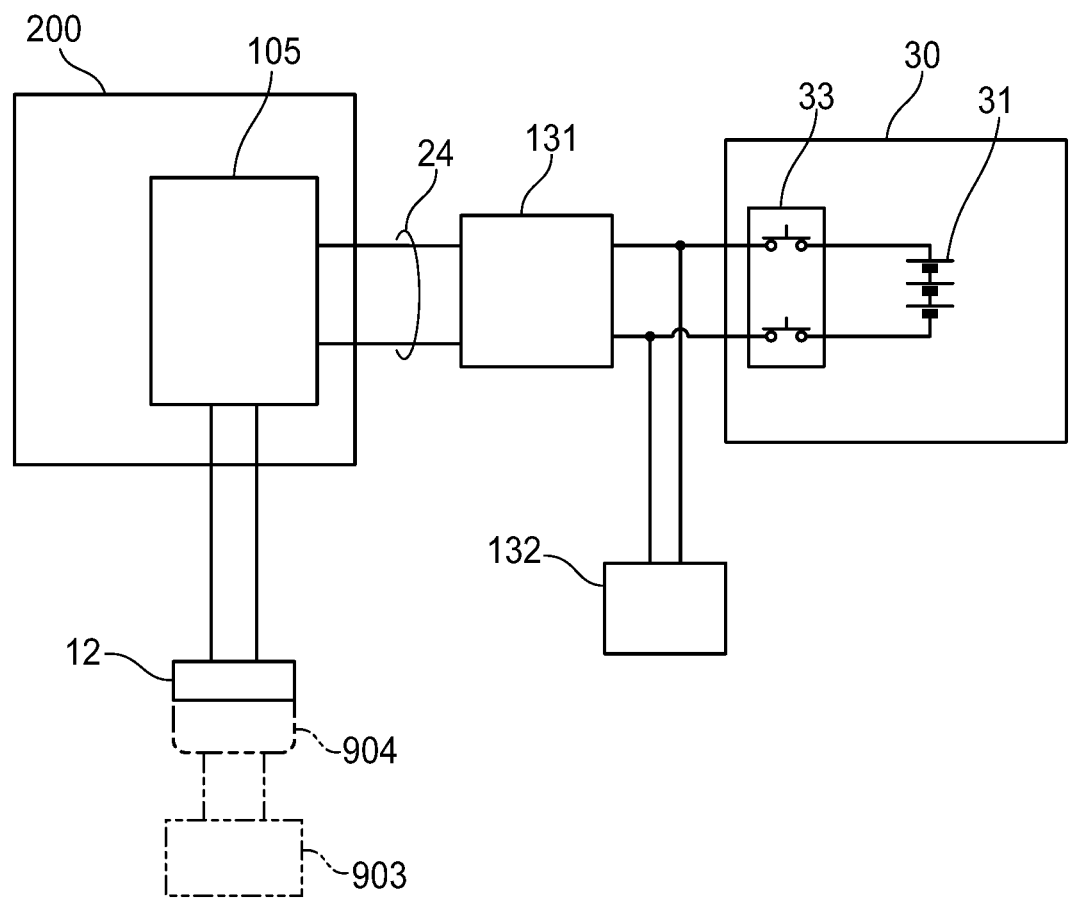
FIG. 8 is a diagram showing a variant of a connection relationship between a power unit and a main battery.

A variant of the connection relationship of the power unit 100 and the battery pack 30 (main battery 31) will be described using FIG. 8. In FIG. 8, only devices related to the second battery power cable 24 are depicted. Other devices are same as those in the block diagram of FIG. 6.

In the variant, a noncontact electric power transmitter 131 is provided at a point on the second battery power cable 24. By providing the noncontact electric power transmitter 131, the main battery 31 can be charged while electrically insulating the external AC power supply 903 and the main battery 31. The noncontact electric power transmitter 131 may typically be an electric power transmitter that uses a transducer.

A solar cell panel 132 is connected to the second battery power cable 24. The main battery 31 may also be charged by the solar cell panel 132.

Some of primary features of the embodiments will be listed. The technical elements described below are each independent technical elements that achieve technical usefulness alone or in various combinations, and are not limited to the combination recited in the claims as originally filed.

(1) The power unit 100 is connected to the main battery 31 by the battery power cables (first battery power cable 23 and second battery power cable 24). The power unit 100 is connected to the DC inlet 11 (AC inlet 12) by the DC inlet power cable 21 (AC inlet power cable 22). The power unit 100 is connected to the electric power converter 9 by the converter power cable 25. The power unit 100 is configured capable of transmitting the electric power supplied through the inlets 11, 12 to the main battery 31, and of transmitting the electric power of the main battery 31 to the electric power converter 9. The power unit 100 is fixed to the body 200 or the frame (side members 4 or cross members 5) of the vehicle.

(2) The motor housing 7 accommodating the motor 70 is supported on the frame (side members 4 or cross members 5) via the vibration absorbers 8. The electric power converter 9 is fixed on the motor housing 7. The electric power converter 9 vibrates together with the motor housing 7. On the other hand, the power unit 100 has the vibration absorbers 8 interposed between itself and the motor housing 7, and the influence of the vibration of the motor housing 7 which the power unit 100 receives is suppressed.

(3) The cross-sectional area of each of the first battery power cable 23 and the DC inlet power cable 21 is larger than the cross-sectional area of the converter power cable 25. The power unit 100 is connected with the electric power converter 9, which vibrates together with the motor housing 7, by the converter power cable 25 having the small cross-sectional area. The influence of the vibration transmitted to the power unit 100 through the converter power cable 25 is minor. On the other hand, the vibration of the motor housing 7 transmitted to the first battery power cable 23 and the DC inlet power cable 21 having the large cross-sectional areas is reduced by the vibration absorbers 8.

(4) The main battery 31 is arranged at the vehicle rear side from the power unit 100. The first battery power cable 23 and the second battery power cable 24 are connected to the rear portion of the power unit 100. Since the battery power cables are connected to the side of the power unit 100 that is closer to the main battery 31, the battery power cables can be made short.

(5) The DC inlet 11 and the AC inlet 12 are provided at the front portion of the vehicle. The DC inlet power cable 21 and the AC inlet power cable 22 are connected to the front portion of the power unit 100. By this structure, the DC inlet power cable 21 and the AC inlet power cable 22 can be made short.

(6) The DC inlet 11 is provided on a lateral side (left lateral side) of the vehicle and the DC inlet power cable 21 is connected to a portion of the power unit 100 that is on a same side as the DC inlet 11 with respect to the center CP of the power unit 100. The AC inlet 12 is provided on a lateral side (right lateral side) of the vehicle and the AC inlet power cable 22 is connected to a portion of the power unit 100 that is on a same side as the AC inlet 12 with respect to the center CP of the power unit 100.

(7) The AC inlet power cable 22 is connected to the second battery power cable 24 via the AC/DC converter 105 inside the power unit 100. The first battery power cable 23 is connected to the power cables 99 of the high voltage devices 90 other than the AC/DC converter 105. The influence of the external AC power supply 903 imposed on the high voltage devices 90 other than the AC/DC converter 105 can be reduced.

(8) The power unit 100 is connected to the DC inlet 11 by the DC inlet power cable 21. The DC inlet power cable 21 is connected to the first battery power cable 23 via the DC relay 103 and the main power line 107 inside the power unit 100.

(9) A first relay is provided between the first battery power cable 23 and the main battery 31. Further, a second relay is provided between the second battery power cable 24 and the main battery 31. The other high voltage devices 90 (such as the electric power converter 9, the cooler 91, the air conditioner 92, and the DC/AC converter 93) can be cut off from the main battery 31 when the main battery 31 is charged by the electric power of the AC power supply 903. On the other hand, during when the charging by the AC power supply 903 is not executed, the AC/DC converter 105 and the AC inlet 12 can be cut off from the main battery 31. The first relay corresponds to the system main relay 32 and the second relay corresponds to the AC charging relay 33.

(10) The electric vehicle 2 (2a, 2b) is provided with a first inlet and a second inlet. The AC power supply outside the vehicle is connectable to one of the inlets. The DC power supply outside the vehicle is connectable to the other of the inlets. The power unit 100 is connected to the first inlet by a first inlet power cable and to the second inlet by a second inlet power cable. The power unit is provided with the first battery connector 123, the second battery connector 124, a first inlet connector, and a second inlet connector. The first battery power cable 23 extending from the main battery 31 is connected to the first battery connector 123. The second battery power cable 24 extending from the main battery 31 is connected to the second battery connector 124.

(11) The first inlet power cable extending from the first inlet is connected to the first inlet connector. The second inlet power cable extending from the second inlet is connected to the second inlet connector. The battery connectors 123, 124 are arranged closer to the main battery 31 than the center CP of the power unit 100 is to the main battery 31. The first inlet connector is arranged closer to the first inlet than the center CP of the power unit 100 is to the first inlet. The second inlet connector is arranged closer to the second inlet than the center CP of the power unit 100 is to the second inlet.

(12) The main battery 31 is arranged at the vehicle rear side from the power unit 100. The battery connectors 123, 124 are provided at the rear portion of the power unit 100.

(13) The first inlet is provided on a first lateral surface of the electric vehicle 2 and the second inlet is provided on a second lateral surface opposite to the first lateral surface of the electric vehicle 2. The first inlet connector is provided on a first lateral surface side from the center CP of the power unit and the second inlet connector is provided on a second lateral surface side from the center CP of the power unit.

The AC inlet 12 corresponds to the first inlet and the DC inlet 11 corresponds to the second inlet. The AC inlet power cable 22 corresponds to the first inlet power cable and the DC inlet power cable 21 corresponds to the second inlet power cable. The AC inlet connector 122 corresponds to the first inlet connector and the DC inlet connector 121 corresponds to the second inlet connector. The DC inlet 11 is provided on the front side of the left lateral surface of the vehicle and the AC inlet 12 is provided on the front side of the right lateral surface of the vehicle.

Other features of the art described in the embodiments will be described. Some of the connectors which the power unit 100 is provided with may have a fuse assembled therein.

The "electric vehicle" in the description herein includes a hybrid vehicle provided with both a motor and an engine and a vehicle that mounts a fuel cell together with a battery.

Specific examples of the present invention have been described in detail, however, these are mere exemplary indications and thus do not limit the scope of the claims. The art recited in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An electric vehicle comprising:
   a main battery;
   a first inlet connectable with a power supply outside the vehicle;
   a second inlet connectable with another power supply outside the vehicle; and
   a power unit connected to the main battery by a battery power cable, connected to the first inlet by a first inlet power cable, and connected to the second inlet by a second inlet power cable;
   wherein
   the power unit comprises:
   a battery connector to which the battery power cable is connected;
   a first inlet connector to which the first inlet power cable is connected; and
   a second inlet connector to which the second inlet power cable is connected,
   the battery connector is closer to the main battery than a center of the power unit is to the main battery,
   the first inlet connector is closer to the first inlet than the center of the power unit is to the first inlet, and
   the second inlet connector is closer to the second inlet than the center of the power unit is to the second inlet.

2. The electric vehicle according to claim 1, wherein
   the main battery is arranged on a rear side in the vehicle from the power unit, and
   the battery connector is arranged at a rear portion of the power unit.

3. The electric vehicle according to claim 1, wherein
   the first inlet is arranged on a first lateral surface of the electric vehicle,
   the second inlet is arranged on a second lateral surface opposite to the first lateral surface of the electric vehicle,
   the first inlet connector is closer to the first lateral surface than the center of the power unit in a vehicle width direction is to the first lateral surface, and
   the second inlet connector is closer to the second lateral surface than the center of the power unit in the vehicle width direction to the second lateral surface.

4. The electric vehicle according to claim 1, wherein
   the first inlet is an AC inlet connectable with an AC power supply configured to output AC power, and the AC inlet is arranged on a right side of the vehicle, and
   the second inlet is a DC inlet connectable with a DC power supply configured to output DC power, and the DC inlet is arranged on a left side of the vehicle.

* * * * *